United States Patent
Lin et al.

(10) Patent No.: US 10,728,930 B2
(45) Date of Patent: *Jul. 28, 2020

(54) NETWORK ACCESS OF A WIRELESS DEVICE TO A COMMUNICATIONS NETWORK

(71) Applicant: Telefonaktiebolaget LM Ericsson (publ), Stockholm (SE)

(72) Inventors: Xingqin Lin, Santa Clara, CA (US); Ansuman Adhikary, Hitech (IN); Johan Mikael Bergman, Stockholm (SE); Yufei Blankenship, Kildeer, IL (US); Asbjörn Grövlen, Stockholm (SE); Hazhir Shokri Razaghi, Kista (SE); Yutao Sui, Solna (SE); Yi-Pin Eric Wang, Fremont, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 7 days.

This patent is subject to a terminal disclaimer.

(21) Appl. No.: 16/084,334

(22) PCT Filed: Mar. 10, 2017

(86) PCT No.: PCT/SE2017/050237
§ 371 (c)(1),
(2) Date: Sep. 12, 2018

(87) PCT Pub. No.: WO2017/160210
PCT Pub. Date: Sep. 21, 2017

(65) Prior Publication Data
US 2019/0075594 A1    Mar. 7, 2019

Related U.S. Application Data

(63) Continuation of application No. 15/295,525, filed on Oct. 17, 2016, now Pat. No. 9,661,663.
(Continued)

(51) Int. Cl.
*H04W 74/08* (2009.01)
*H04W 48/12* (2009.01)
(Continued)

(52) U.S. Cl.
CPC ........ *H04W 74/085* (2013.01); *H04B 17/318* (2015.01); *H04L 5/0048* (2013.01);
(Continued)

(58) Field of Classification Search
CPC ............. H04W 74/085; H04W 74/006; H04W 74/0833; H04W 74/0841; H04W 4/70;
(Continued)

(56) References Cited

U.S. PATENT DOCUMENTS

2014/0044108 A1    2/2014  Earnshaw et al.
2014/0098761 A1*   4/2014  Lee .................... H04W 74/006
                                                       370/329
(Continued)

FOREIGN PATENT DOCUMENTS

KR    1020150109925     10/2015
RU       2472318 C2      1/2013
(Continued)

OTHER PUBLICATIONS

Nokia Networks, et al., "Random Access procedure for NB-IoT", 3GPP TSG-RAN WG1 Meeting #84, Feb. 15. 2016, pp. 1-3, St. Julian's, Malta, R1-160458.
(Continued)

*Primary Examiner* — Candal Elpenord
(74) *Attorney, Agent, or Firm* — Coats & Bennett, PLLC

(57) ABSTRACT

A communications network is being accessed by a wireless device associated with a coverage class selected from a set of coverage classes. The wireless device performs a method comprising initiating network access to the communications network by transmitting a preamble sequence for random
(Continued)

access on a physical random access channel during a starting opportunity defined by the coverage class of the wireless device. Each coverage class may be associated with a unique number of repetitions of the preamble sequence transmission.

30 Claims, 8 Drawing Sheets

Related U.S. Application Data

(60) Provisional application No. 62/309,389, filed on Mar. 16, 2016.

(51) Int. Cl.
| | | |
|---|---|---|
| *H04W 74/00* | (2009.01) | |
| *H04B 17/318* | (2015.01) | |
| *H04L 27/26* | (2006.01) | |
| *H04L 5/00* | (2006.01) | |
| *H04W 4/70* | (2018.01) | |

(52) U.S. Cl.
CPC ...... *H04L 27/2607* (2013.01); *H04L 27/2613* (2013.01); *H04L 27/2614* (2013.01); *H04L 27/2636* (2013.01); *H04W 4/70* (2018.02); *H04W 48/12* (2013.01); *H04W 74/006* (2013.01); *H04W 74/0833* (2013.01); *H04W 74/0841* (2013.01); *H04L 5/0007* (2013.01); *H04W 74/0858* (2013.01)

(58) Field of Classification Search
CPC .... H04W 48/12; H04B 17/318; H04L 5/0048; H04L 27/2607; H04L 27/2613; H04L 27/2614; H04L 27/2636
USPC .................................................. 370/328–330
See application file for complete search history.

(56) References Cited

U.S. PATENT DOCUMENTS

| | | | |
|---|---|---|---|
| 2014/0313999 A1 | 10/2014 | Xu et al. | |
| 2015/0078264 A1 | 3/2015 | Han et al. | |
| 2015/0078330 A1 | 3/2015 | Nakao et al. | |
| 2015/0085717 A1 | 3/2015 | Papasakellariou | |
| 2015/0117233 A1* | 4/2015 | Wong .................. | H04W 4/70 370/252 |
| 2015/0236932 A1* | 8/2015 | Yu ........................ | H04B 17/309 370/252 |
| 2016/0007377 A1 | 1/2016 | Frenne et al. | |
| 2016/0227582 A1 | 8/2016 | Vajapeyam et al. | |
| 2016/0338032 A1 | 11/2016 | Wang et al. | |
| 2016/0353440 A1 | 12/2016 | Lee et al. | |
| 2016/0353486 A1* | 12/2016 | Xia ..................... | H04W 74/006 |
| 2017/0048014 A1 | 2/2017 | Lampinen et al. | |
| 2017/0280484 A1* | 9/2017 | Awad .................. | H04W 74/006 |
| 2017/0290064 A1* | 10/2017 | Liu ..................... | H04W 74/006 |
| 2017/0347361 A1* | 11/2017 | Tsuboi .................. | H04W 72/08 |
| 2019/0044659 A1* | 2/2019 | Ain ....................... | H04W 16/26 |

FOREIGN PATENT DOCUMENTS

| | | |
|---|---|---|
| WO | 2009088338 A1 | 7/2009 |
| WO | 2015005701 A1 | 1/2015 |
| WO | 2015142072 A1 | 9/2015 |
| WO | 2017055302 A1 | 4/2017 |
| WO | 2017131577 A1 | 8/2017 |
| WO | 2017137060 A1 | 8/2017 |

OTHER PUBLICATIONS

ZTE, "Random access procedure for NB-IoT", 3GPP TSG RAN WG1 #84, Feb. 15, 2016, pp. 1-3, St. Julian's, Malta, R1-160483.
Sony, "NB-PRACH Coverage Levels", 3GPP TSG RAN WG1 Meeting #84, Feb. 15, 2016, pp. 1-3, St. Julian's, Malta, R1-160768.
Huawei et al., "WF on NB-PRACH coverage level procedures", 3GPP TSG RAN WG1 Meeting #84, Feb. 15, 2016, pp. 1-3, St. Julian's, Malta, R1-161313.
Huawei et al., "WF on random access procedures", 3GPP TSG RAN WG1 Meeting #84, Feb. 15, 2016, pp. 1-4, St. Julian's, Malta, R1-161314.
Huawei et al., "NB-PRACH design", 3GPP TSG RAN WG1 Meeting #84, Feb. 15, 2016, pp. 1-8, St. Julian's, Malta, R1-161357.
LG et al., "WF on Random access procedures", 3GPP TSG RAN WG1 #84, Feb. 15, 2016, pp. 1-2, St. Julian's, Malta, R1-161367.
Ericsson, "NB-IoT—Remaining issues for random access procedure", 3GPP TSG-RAN WG1 NB-IoT Ad-Hoc Meeting, Mar. 22, 20162, pp. 1-7, Sophia Antipolis, France, R1-161836.
ZTE, "Random Access Design of NB-IoT", 3GPP TSG RAN WG1 Meeting #83, Nov. 15, 2015, pp. 1-4, Anaheim, USA, R1-156628.
LG Electronics, "Discussion on Random Access Procedure for NB-IoT", 3GPP TSG RAN WG1 Meeting #83, Nov. 15, 2015, pp. 1-4, Anaheim, USA, R1-156885.
ETRI, "Considerations on random access design", 3GPP TSG RAN WG1 Meeting #83, Nov. 16, 2015, pp. 1-3, Anaheim, USA, R1-157108.
ZTE, "NB-IoT—Initial analysis of PRACH capacity", 3GPP TSG RAN WG1 Meeting #83, Nov. 16, 2015, pp. 1-3, Anaheim, USA, R1-157199.
Ericsson, "NB-IoT—Random access", 3GPP TSG-RAN WG1 NB-IOT Ad Hoc Meeting, Jan. 18, 2016, pp. 1-5, Budapest, Hungary, R1-160096.
Ericsson et al., "WF on PRACH design", 3GPP TSG-RAN WG1 NB-IOT Ad Hoc Meeting, Jan. 18, 2016, pp. 1-3, Budapest, Hungary, R1-16xxxx.
Ericsson, "LS on PRACH format", 3GPP TSG-RAN WG1 NB-IOT Ad Hoc Meeting, Jan. 18, 2016, p. 1, Budapest, Hungary, R1-160200.
Ericsson, "NB-IoT—Random access", 3GPP TSG RAN WG1 Meeting #84, Feb. 15, 2016, pp. 1-4, St. Julian's, Malta, R1-160278.
Huawei et al., "NB-PRACH design", 3GPP TSG RAN WG1 Meeting #84, Feb. 15, 2016, pp. 1-8, St. Julian's, Malta, R1-160316.
Huawei et al., "Remaining NB-IoT random access physical layer aspects", 3GPP TSG RAN WG1 Meeting #84, Feb. 15, 2016, pp. 1-4, St. Julian's, Malta, R1-160327.
Intel Corporation, "NB-PRACH and random access procedure", 3GPP TSG RAN WG1 Meeting #84, Feb. 15, 12016, pp. 1-4, St. Julian's, Malta, R1-160415.
Nokia Networks, et al., "NB-PRACH design for NB-IoT", 3GPP TSG RAN WG1 Meeting #84, Feb. 15, 2016, pp. 1-3, St. Julian's, Malta, R1-160457.
Wi Rapporteur (Ericsson), "RAN1 agreements for Rel-13 eMTC sorted and edited by topic," 3GPP TSG RAN WG1 Meeting #84, Feb. 15, 2016, pp. 1-44, St. Julian's, Malta, R1-161546.
Wi Rapporteur (Ericsson), "RAN1 Chairman's Notes," 3GPP TSG RAN WG1 Meeting #84, Feb. 15, 2016, pp. 1-72, St. Julian's, Malta.
Nokia Networks, et al., "Random Access procedure for NB-IoT", 3GPP TSG-RAN WG2 Meeting #93, St. Julian's, Malta, Feb. 15, 2016, pp. 1-4, R2-161526.
Huawei, et al., "Considerations on the random access of MTC UEs with coverage improvement", 3GPP TSG RAN WG I Meeting #75, San Francisco, USA, Nov. 11, 2013, pp. 1-5, Rl-135020.

* cited by examiner

NETWORK ACCESS OF A WIRELESS DEVICE TO A COMMUNICATIONS NETWORK

TECHNICAL FIELD

Embodiments presented herein relate to a method, a wireless device, a computer program, and a computer program product for network access of the wireless device to a communications network. Further embodiments presented herein relate to a method, a network node, a computer program, and a computer program product for enabling network access of the wireless device to the communications network.

BACKGROUND

In communications networks, there may be a challenge to obtain good performance and capacity for a given communications protocol, its parameters and the physical environment in which the communications network is deployed.

For example, evolving services are associated with new requirements on cellular networks, e.g. with respect to device cost, battery lifetime and coverage. To drive down device and module cost, a system-on-a-chip (SoC) solution with integrated power amplifier (PA) can be used. However, it is feasible for the current state-of-the-art PA technology to allow 20-23 dBm transmit power when PA is integrated to SoC. This constraint limits uplink coverage, which is related to how much the path loss is allowed between the end-user wireless device and network node of the communications network.

To maximize the coverage achievable by an integrated PA, it is commonly necessary to reduce PA backoff. PA backoff may be defined as the ratio of maximal saturation output power and average output power of the PA. PA backoff is needed when the communication signal has significant non-unity peak-to-average power ratio (PAPR). The higher the PAPR is, the higher PA backoff is required. Higher PA backoff also gives rise to lower PA efficiency, and thus lower device battery life time. Thus, designing an uplink communication signal that has as low PAPR as possible—and thereby reduces the necessary PA backoff—could lower the device cost, increase the battery lifetime and increase the coverage of the wireless device.

It could be possible to evolve existing cellular communications (such as Long Term Evolution; LTE) specifications to include support for Narrowband Internet-of-Things (NB-IoT) technologies. In this respect, the LTE uplink is based on single-carrier frequency-division multiple-access (SC-FDMA) modulation for the uplink data and control channels, and Zadoff-Chu signal for random access. Neither of these signals has good PAPR properties.

Hence, there is still a need for an improved handling of network access for a wireless device in a communications network.

SUMMARY

An object of embodiments herein is to provide efficient handling of network access for a wireless device in a communications network According to a first aspect there is presented a method for network access of a wireless device to a communications network. The wireless device is associated with a coverage class from a set of coverage classes. The method is performed by the wireless device. The method comprises initiating network access to the communications network by transmitting a preamble sequence for random access on a physical random access channel (PRACH). Wherein the network access is initiated during a starting opportunity defined by the coverage class of the wireless device.

According to a second aspect there is presented a wireless device for network access of the wireless device to a communications network. The wireless device is associated with a coverage class from a set of coverage classes. The wireless device comprises processing circuitry. The processing circuitry is configured to cause the wireless device to initiate network access to the communications network by transmitting a preamble sequence for random access on a physical random access channel (PRACH) The network access is initiated during a starting opportunity defined by the coverage class of the wireless device.

According to a third aspect there is presented a wireless device for network access of the wireless device to a communications network. The wireless device is associated with a coverage class from a set of coverage classes. The wireless device comprises processing circuitry and a computer program product storing instructions that, when executed by the processing circuitry, causes the wireless device to initiate network access to the communications network by transmitting a preamble sequence for random access on a physical random access channel (PRACH). The network access is initiated during a starting opportunity defined by the coverage class of the wireless device.

According to a fourth aspect there is presented a wireless device for network access of the wireless device to a communications network. The wireless device is associated with a coverage class from a set of coverage classes. The wireless device comprises an initiate module configured to initiate network access to the communications network by transmitting a preamble sequence for random access on a physical random access channel (PRACH). The network access is initiated during a starting opportunity defined by the coverage class of the wireless device.

According to a fifth aspect there is presented a computer program for network access of a wireless device to a communications network, the computer program comprising computer program code which, when run on processing circuitry of the wireless device, causes the wireless device to perform a method according to the first aspect.

According to a sixth aspect there is presented a method for enabling network access of a wireless device to a communications network. The wireless device is associated with a coverage class from a set of coverage classes. The method is performed by a network node. The method comprises providing a network access configuration to the wireless device. The network access configuration specifies network access initiation to the communications network for the wireless device. The network access configuration specifies a starting opportunity defined by the coverage class of the wireless device during which network access is to be initiated.

According to a seventh aspect there is presented a network node for enabling network access of a wireless device to a communications network. The wireless device is associated with a coverage class from a set of coverage classes. The network node comprises processing circuitry. The processing circuitry is configured to cause the network node to provide a network access configuration to the wireless device. The network access configuration specifies network access initiation to the communications network for the wireless device. The network access configuration specifies a starting opportunity defined by the coverage class of the wireless device during which network access is to be initiated.

According to an eighth aspect there is presented a network node for enabling network access of a wireless device to a communications network. The wireless device is associated with a coverage class from a set of coverage classes. The network node comprises processing circuitry and a computer program product storing instructions that, when executed by the processing circuitry, causes the network node to provide a network access configuration to the wireless device. The network access configuration specifies network access initiation to the communications network for the wireless device. The network access configuration specifies a starting opportunity defined by the coverage class of the wireless device during which network access is to be initiated.

According to a ninth aspect there is presented a network node for enabling network access of a wireless device to a communications network. The network node comprises a provide module configured to provide a network access configuration to the wireless device. The network access configuration specifies network access initiation to the communications network for the wireless device. The network access configuration specifies that the network access is to be initiated during a starting opportunity defined by the coverage class of the wireless device.

According to a tenth aspect there is presented a computer program for enabling network access of a wireless device to a communications network, the computer program comprising computer program code which, when run on processing circuitry of a network node, causes the network node to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium can be a non-transitory computer readable storage medium.

Advantageously these methods and devices provide efficient handling of network access of the wireless device to the communications network.

Advantageously these methods and devices enable time collision of PRACH opportunities of different coverage classes to be avoided.

Advantageously these methods and devices particularly apply to NB-IoT and Enhanced Machine-Type Communication (eMTC).

It is to be noted that any feature of the first, second, third, fourth, fifth, sixth seventh, eighth, ninth, tenth and eleventh aspects may be applied to any other aspect, wherever appropriate. Likewise, any advantage of the first aspect may equally apply to the second, third, fourth, fifth, sixth, seventh, eighth, ninth, tenth, and/or eleventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, on which.

Unless otherwise stated, like references numerals indicate like elements on the drawings.

DETAILED DESCRIPTION

Figure 1:
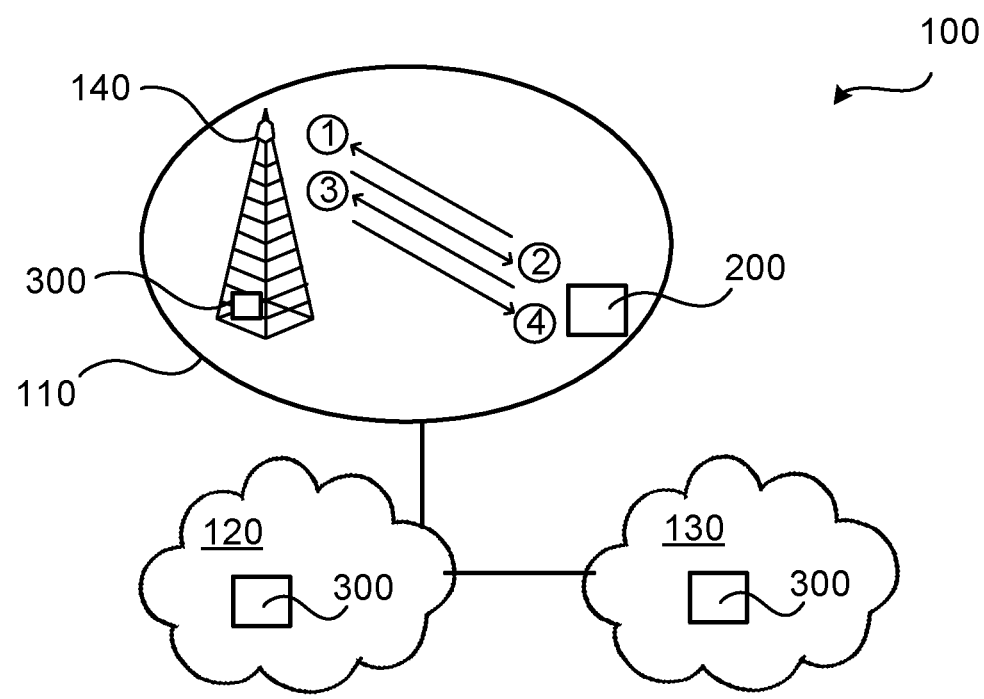
FIG. 1 is a schematic diagram illustrating a communication network according to embodiments.

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Single-tone frequency-hopping NB-IoT PRACH (denoted NPRACH) signals have low PAPR, and thus the use of NPRACH reduces the need for PA backoff and maximizes PA efficiency. NPRACH signals are compatible with SC-FDMA and orthogonal frequency-division multiple-access (OFDMA) since, in any OFDM symbol interval, the NPRACH signals appear like an OFDM signal of one single subcarrier.

To support the random access design, the network node should be able to configure time resource information that informs the wireless devices when (in time) to transmit the NPRACH and frequency resource information that directs wireless devices where (in frequency) to transmit the NPRACH.

In NB-IoT random access, up to three different coverage classes may be supported in NPRACH. Coverage classes are also referred to as coverage levels, coverage enhancement levels (CE levels or CELs), or enhanced coverage levels; the term coverage classes will be used hereinafter. For example, coverage classes may correspond to a value of a minimum coupling loss (MCL), which may signify a minimum distance loss—possibly including antenna gain—measured between antenna connectors, such as 144 dB MCL or 164 dB MCL. More generally, coverage classes may correspond to x dB MCL, where x is selected from a predetermined collection of two or more values, e.g. {144, 164}. Coverage classes may alternatively be associated with respective values of a received power of a signal which the wireless device receives, in particular a reference signal. As discussed in more detail below, coverage classes may correspond to the number of repetitions of an NPRACH signal that a UE transmits.

The received powers of NPRACH transmissions from wireless devices in different coverage classes can differ significantly, resulting in a severe near-far problem if the transmissions use the same time and frequency NPRACH opportunities. As an example, supporting 164 dB maximum coupling loss is a design target of NB-IoT, while the maximum coupling loss of wireless devices in normal coverage is often limited to 144 dB. This may result in 20 dB received power difference under the ideal conditions that the wireless devices are able to estimate their coupling loss perfectly and the open loop power control used in NPRACH transmissions is perfect. In practice, the estimate of coupling loss by the wireless devices may be subject to errors in, e.g., the range [−6, 6] dB, leading to even larger received power differences in NPRACH transmissions. It is therefore proposed to separate NPRACH opportunities of different coverage classes in time and/or frequency domain.

One alternative to separating NPRACH opportunities of different coverage classes is to configure different NPRACH frequency bands for different coverage classes in the frequency domain. However, if the network node is to configure only one or two NPRACH frequency bands, a mechanism is still needed to separate the NPRACH of three different coverage classes in the time domain.

In the existing LTE random access procedure, random access serves multiple purposes such as initial network access when a radio link is established between the wireless device and the communications network, scheduling request for the wireless device, etc. Among others, one objective of random access is to achieve uplink synchronization for maintaining the uplink orthogonality in LTE. To preserve orthogonality among different wireless devices in an OFDMA or SC-FDMA system, the time of arrival of each wireless device's signal needs to be within the cyclic prefix (CP) of the OFDMA or SC-FDMA signal at the network node.

LTE random access can be either contention-based or contention-free. The contention-based random access procedure consists of four steps, as illustrated in FIG. 1.

FIG. 1 is a schematic diagram illustrating a communications network 100 where embodiments presented herein can be applied. The communications network 100 comprises a radio access network 110, a core network 120 and a service network 130. The radio access network 100 comprises at least one radio access network node (RANN) 140. The radio access network node 140 can be provided by any of a radio base station, a base transceiver station, a remote radio head, an access point, an access node, a NodeB, or an evolved NodeB. The radio access network node 140 provides services and network access to at least one wireless device (WD) 200. The wireless device 200 can be a portable wireless device, a mobile station, a mobile phone, a handset, a wireless local-loop phone, a user equipment (UE), a smartphone, a laptop computer, a tablet computer, a network equipped sensor device, an Internet-of-Things device, or a wireless broadband modem.

The radio access network 110 is operatively connected to the core network 120, which in turn is operatively connected to the service network 130. A wireless device 200 being operatively connected to the radio access network node 140 is thereby enabled to access services and exchange data with the service network 130.

The communications network 100 further comprises at least one network node 300. Further details of the network node 300 will be disclosed below.

The contention-based random access procedure comprises steps 1-4:
 Step 1: The wireless device 200 transmits a random access preamble to the network node 300.
 Step 2: The network node 300 responds to the random access preamble by transmitting a random access response including, for example, an uplink grant, to the wireless device 200.
 Step 3: The wireless device 200 transmits a scheduled transmission to the network node 300.
 Step 4: The network node 300 transmits a message for contention resolution of the wireless device 200.

Note that only step 1 involves physical-layer processing specifically designed for random access, while the remaining steps 2-4 follow the same physical-layer processing used in uplink and downlink data transmission. For contention-free random access, the wireless device uses reserved preambles assigned by the base station. In this case, contention resolution is not needed, and thus only steps 1 and 2 are required.

Figure 2:
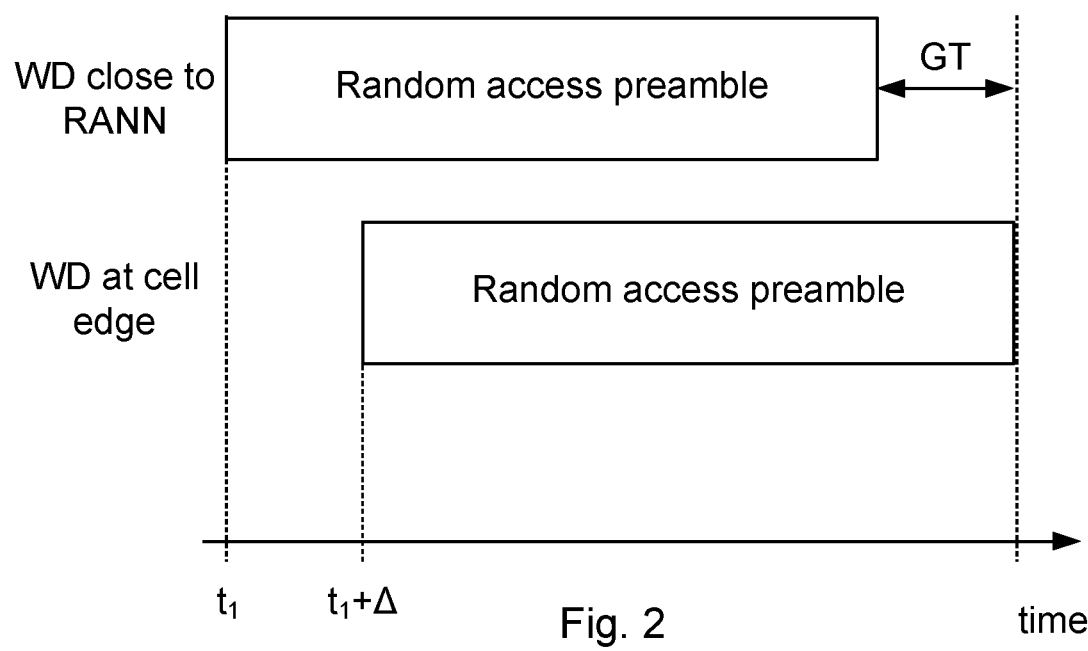
FIG. 2 schematically illustrates reception of random access preambles at a radio access network node.

NPRACH serves similar purposes as in LTE, and reuses the random access procedure in LTE. As shown in FIG. 1, in the first step, a PRACH preamble sequence is sent by the UE during a random access time segment illustrated in FIG. 2. For a wireless device close to the radio access network node the random access preamble is received at time $t=t_1$. For a wireless device at the cell edge (far from the radio access network node) the random access preamble is received at time $t=t_1+\Delta$. The PRACH preamble sequence does not occupy the entire random access segment, leaving some time as guard time (GT). As discussed above, to maximize PA efficiency and coverage, it is desirable to have PRACH preambles as close to constant-envelope as possible. Also, the PRACH preambles should be designed such that accurate time-of-arrival estimation can be performed by the base stations. In the below description, the terms PRACH signal and PRACH preamble will be used interchangeably.

Figure 3:
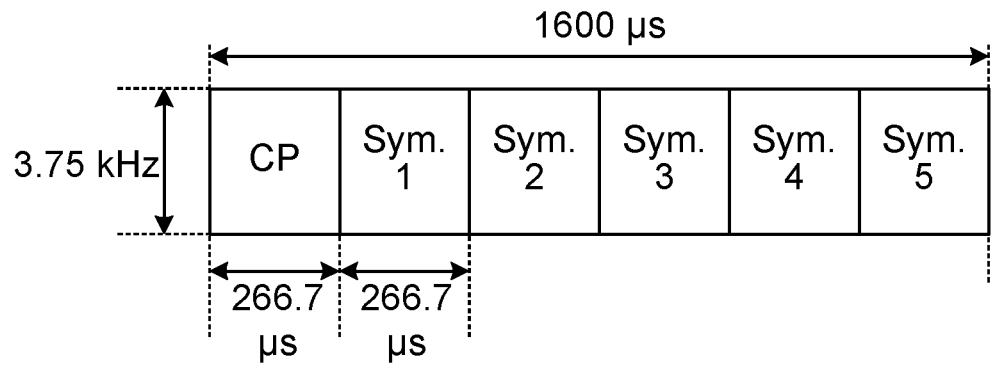
FIG. 3 schematically illustrates a PRACH symbol group structure.

One example of the basic structure of a PRACH symbol group is illustrated in FIG. 3. It is basically a single tone OFDM signal. Unlike traditional OFDM symbols where the non-CP part consists of a single symbol, the non-CP part of the PRACH symbol group in FIG. 3 may consist of one or more symbols. As an example, one CP (of length either 266.7 μs or 66.7 μs) and five symbols constitute a basic symbol group. The symbol structure with 266.7 μs CP and five symbols is illustrated in FIG. 3.

Figure 4:
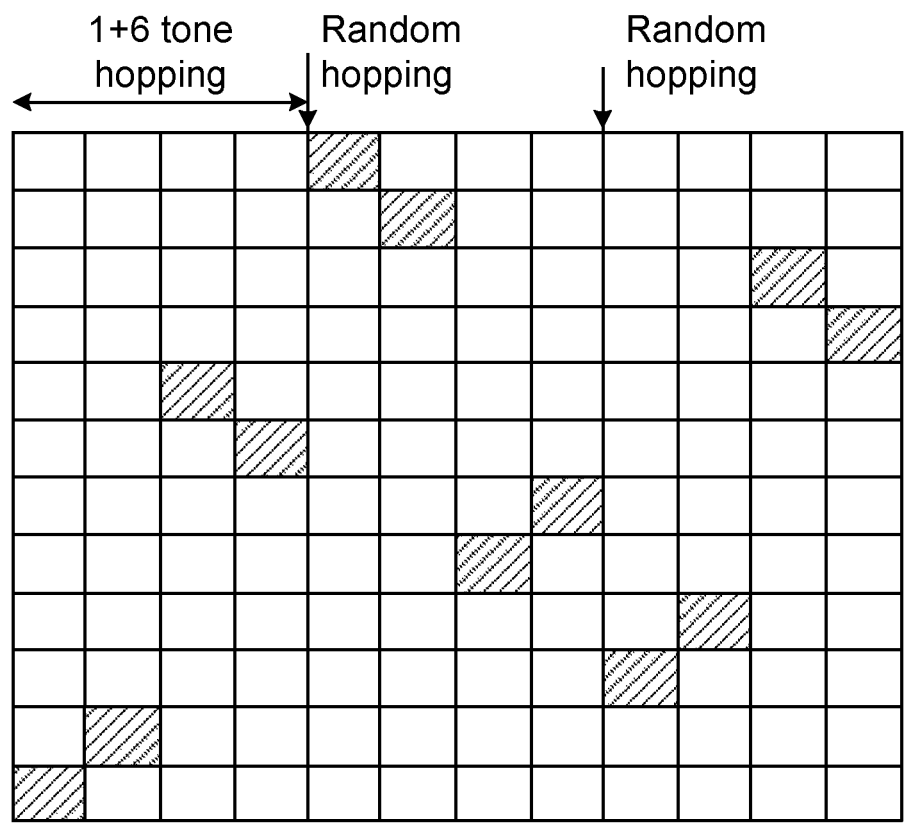
FIG. 4 schematically illustrates a PRACH hopping pattern.

A number of OFDM symbol groups, each one as illustrated in FIG. 3, are concatenated to form a PRACH preamble. But the frequency positions of the symbol groups of the same PRACH preamble vary according to some hopping patterns. One example of a hopping pattern is illustrated in FIG. 4.

Figure 5:
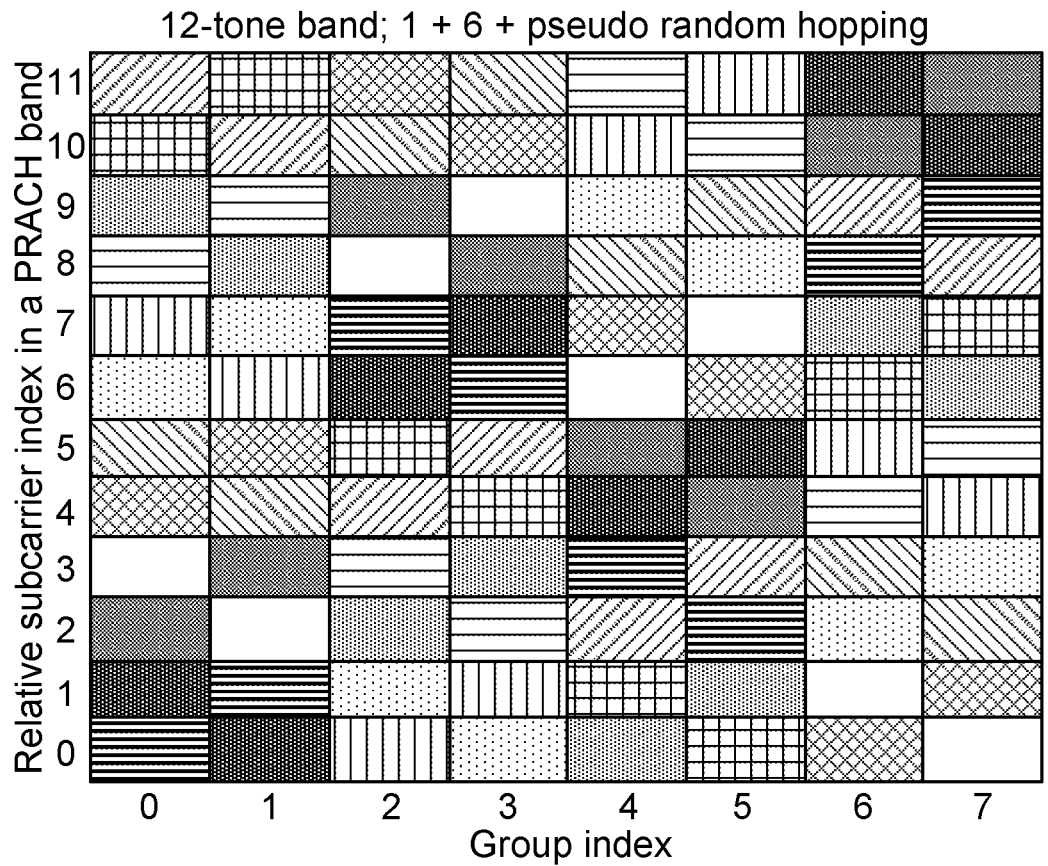
FIG. 5 schematically illustrates a 12-tone (12-subcarrier) NPRACH band.

Based on using single-tone frequency-hopping NPRACH, 12 tones (of total bandwidth 3.75·12=45 kHz) can be used as the basic frequency resource band (such as 6 PRBs in LTE PRACH) for the configuration design. This 12-tone NPRACH band concept is illustrated in FIG. 5.

For wireless devices in normal coverage, a NPRACH preamble transmission with 4 or 8 symbol groups can be sufficient in order for the wireless device to successfully complete the random access procedure. For wireless devices in extreme low coverage with e.g., 164 dB maximum coupling loss, a NPRACH preamble transmission with 128 or more symbol groups may be required.

It could be beneficial to avoid collision of NPRACH transmissions from wireless devices in different coverage classes when they use the same NPRACH frequency band. Mechanisms are therefore proposed to separate NPRACH opportunities of different coverage classes in the time domain.

Assume, for example as in eMTC, that the range for the RRC parameter for PRACH starting subframe periodicity (expressed in terms of PRACH opportunities) is defined by prachStartingSubframe, which may take one of the values in the set {2, 4, 8, 16, 32, 64, 128, 256}, where prachStartingSubframe is a parameter defining the PRACH starting subframe. Further assume that the offset (expressed in terms of PRACH opportunities) is defined by N·prachStartingSubframe+numRepetitionPerPreambleAttempt, where N≥0 is an integer, and where numRepetitionPerPreambleAttempt is a parameter defining the number of repetitions of random access transmissions allowed per preamble attempt. In 3GPP specifications of eMTC, the initial transmission of a preamble sequence is counted in the "number of repetitions"; for example, transmitting a preamble sequence twice per attempt may correspond to numRepetitionsPerPreambleAttempt being equal to 2. The total number of repetitions may depend on the number of allowed preamble transmission attempts, which may correspond to a different parameter.

Figure 6:
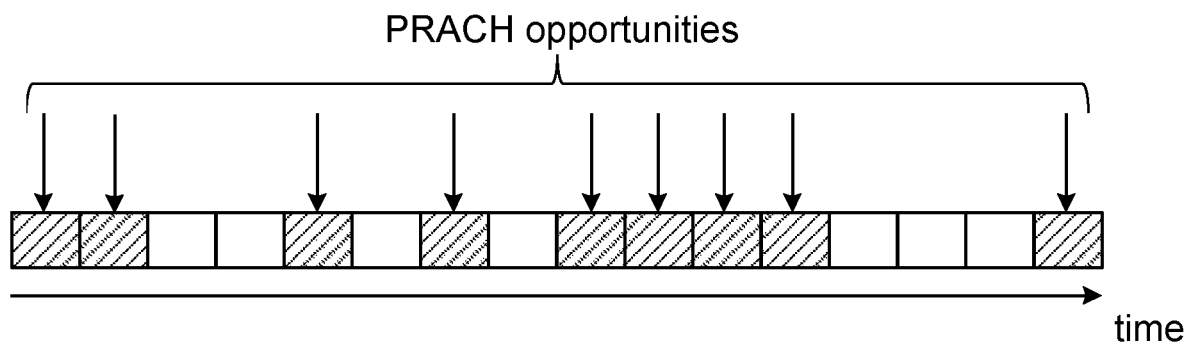
FIGS. 6-7 schematically illustrate PRACH opportunities according to prior art.

Here prachStartingSubframe is expressed in terms of PRACH opportunities, not the absolute time or number of symbol groups. Time-domain PRACH opportunities can be regarded as slots in the time domain resources that can be used for PRACH transmissions, as illustrated in FIG. 6. Time-domain resources between slots may be used for other purposes, such as data transmissions. Since time-domain resources between PRACH opportunities are not relevant for the embodiments disclosed herein, such time-domain resources will be omitted in below-referenced FIGS. 7-12.

A non-limiting illustrative example will be used to illustrate how the random access procedure for eMTC can be used for NB-IoT. As an example, suppose that there are 16 opportunities every 128 ms. Consider three different coverage classes, denoted coverage class 1, coverage class 2, and coverage class 3 with properties listed below:

For coverage class 1, 4 symbol groups are used (i.e., no repetition with respect to a set of 4 symbol groups; this may correspond to a value 1 of a repetition parameter) and can be transmitted completely using one PRACH opportunity.

For coverage class 2, 8 symbol groups are needed (i.e., 2 repetitions with respect to a set of 4 symbol groups; this may correspond to a value 2 of a repetition parameter) and can be transmitted using 2 PRACH opportunities.

For coverage class 3, 32 symbol groups are needed (i.e., 8 repetitions with respect to a set of 4 symbol groups; this may correspond to a value 8 of a repetition parameter) and can be transmitted using 8 PRACH opportunities.

Figure 7:
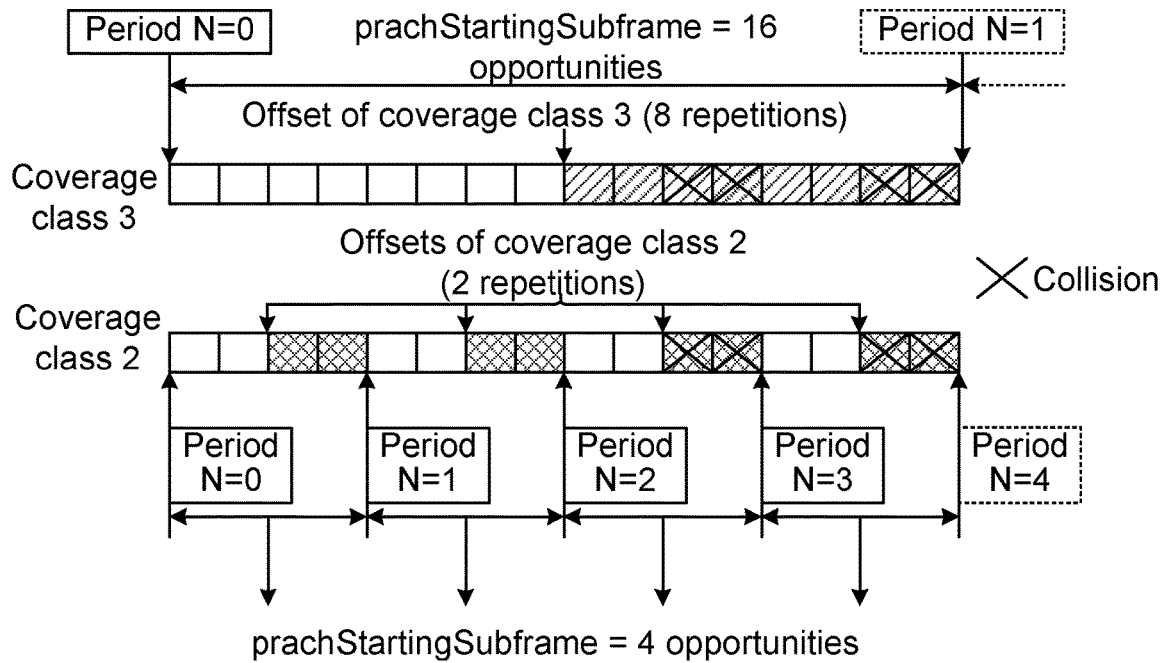

In principle, in eMTC different prachStartingSubframe are allowed for different coverage classes. This however may complicate the network configuration for avoiding PRACH collisions of wireless devices in different coverage classes. One example of such a case is provided below and is also illustrated in FIG. 7:

Coverage class 2 has 2 repetitions: prachStartingSubframe=4 and thus the offset is any value in the set {0, 1, 2, 3}·4+2={2, 6, 10, 14} within 16 opportunities. As seen in FIG. 7, N=0, 1, 2 or 3 for coverage class 2. FIG. 7 shows four preamble transmission attempts with two repetitions each.

Coverage class 3 has 8 repetitions: prachStartingSubframe=16 and thus the offset is 0·16+8=8 within 16 opportunities. As seen in FIG. 7, N=0 for coverage class 3.

The embodiments disclosed herein relate to mechanisms for handling time collision of PRACH opportunities of different coverage classes.

The embodiments disclosed herein thus relate to mechanisms for network access of a wireless device to a communications network. In order to obtain such mechanisms there is provided a wireless device 200, a method performed by the wireless device 200, a computer program product comprising code, for example in the form of a computer program, that when run on processing circuitry of the wireless device 200, causes the wireless device 200 to perform the method. In order to obtain such mechanisms there is further provided a network node 300, a method performed by the network node 300, and a computer program product comprising code, for example in the form of a computer program, that when run on processing circuitry of the network node 300, causes the network node 300 to perform the method.

Figure 13:
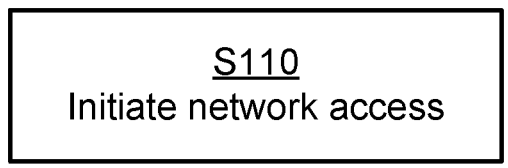
FIGS. 13-16 are flowcharts of methods according to embodiments.
Figure 15:
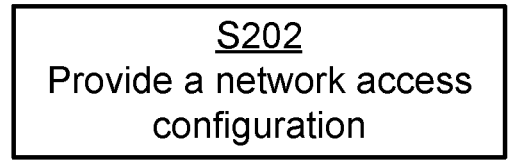
Figure 14:
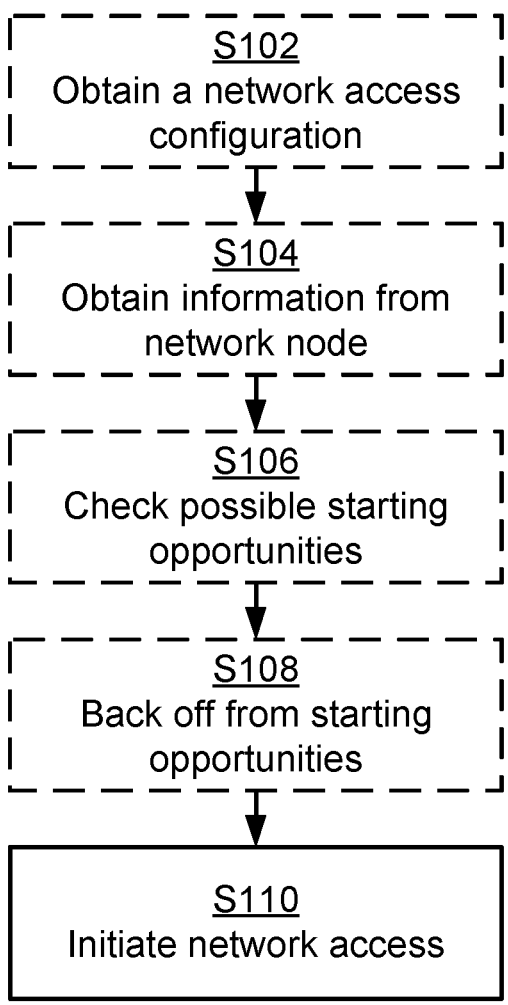
Figure 16:
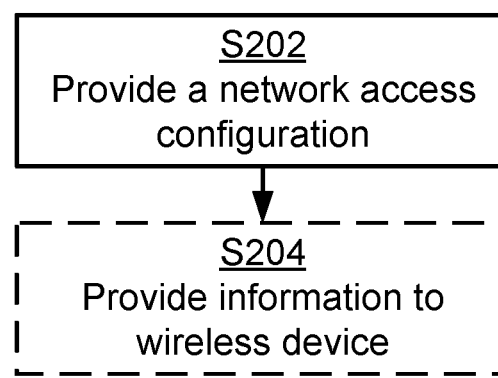

FIGS. 13 and 14 are flow charts illustrating embodiments of methods for network access of the wireless device 200 to the communications network 100 as performed by the wireless device 200. FIGS. 15 and 16 are flow charts illustrating embodiments of methods for enabling network access of the wireless device 200 to the communications network 100 as performed by the network node 300. The methods are advantageously provided as computer programs 420a, 420b.

Reference is now made to FIG. 13 illustrating a method for network access of the wireless device 200 to the communications network 100 as performed by the wireless device 200 according to an embodiment.

The wireless device 200 is associated with a coverage class from a set of coverage classes. Preferably, the set comprises two, three or more coverage classes.

S110: The wireless device 200 initiates network access to the communications network 100 by transmitting a preamble sequence for random access on a physical random access channel (PRACH). The network access is initiated during a starting opportunity defined by the coverage class of the wireless device 200. Accordingly, the preamble sequence is transmitted during the starting opportunity and possibly repeated.

Reference is now made to FIG. 14 illustrating methods for network access of the wireless device 200 to the communications network 100 as performed by the wireless device 200 according to further embodiments. It is assumed that step S110 is performed as described with reference to FIG. 13.

There could be different ways for the wireless device 200 to obtain the network access configuration. For example, according to an embodiment the wireless device 200 is configured to perform step S102.

S102: The wireless device 200 obtains the network access configuration from the network node 300.

As will be further disclosed below the wireless device 200 can be provided with information from the network node 300 on how many of the coverage classes in the set of coverage classes share the frequency band of the coverage class of the wireless device 200. According to an embodiment the wireless device 200 is therefore configured to perform step S104.

S104: The wireless device 200 obtains information from the network node 300 on how many of the coverage classes in the set of coverage classes share the frequency band of the coverage class of the wireless device 200.

Reference is now made to FIG. 15 illustrating a method for enabling network access of the wireless device 200 to the communications network 100 as performed by the network node 300 according to an embodiment.

As disclosed above, the wireless device 200 is associated with a coverage class from a set of coverage classes.

S202: The network node 300 provides a network access configuration to the wireless device 200. The network access configuration specifies network access initiation to the communications network 100 for the wireless device 200. The network access configuration specifies that the network access is to be initiated during a starting opportunity defined by the coverage class of the wireless device 200. According to an embodiment, the network node 300 provides the wireless device 200 with a network access configuration including a plurality of starting opportunities associated with different coverage classes. The starting opportunities may relate to distinct time resources. Among the starting opportunities, the coverage class of the wireless device 200 defines a starting opportunity during which the wireless device 200 is to initiate network access by transmitting a preamble sequence for random access on a physical random access channel. This may imply that the wireless device 200 receives a network access configuration which, in addition to the one or more starting opportunities of the wireless device 200, specifies at least one further starting opportunity; the further starting opportunity may be used by wireless devices associated with a different coverage class.

Reference is now made to FIG. 16 illustrating methods for enabling network access of the wireless device 200 to the communications network 100 as performed by the network node 300 according to further embodiments. It is assumed that step S202 is performed as described with reference to FIG. 15.

According to an embodiment the network node 300 is configured to perform step S204:

S204: The network node 300 provides information to the wireless device 200 on how many of the coverage classes in the set of coverage classes share the frequency band of the coverage class of the wireless device 200.

Embodiments common to both the wireless device 200 and the network node 300 will now be presented.

With reference again made to FIG. 1, the network access initiation as performed by the wireless device 200 in step S110 (FIGS. 13 and 14) takes the place of transmitting the random access preamble in step 1. It can be assumed that the preamble sequence for random access as transmitted by the wireless device 200 is received by the network node 300. Steps 2-4 of FIG. 1 may then follow; in case contention resolution is not needed only steps 1 and 2 are required to be performed.

According to some aspects the starting opportunities are unique for each coverage class. Hence, according to an embodiment no two different coverage classes in the set of coverage classes share a common starting opportunity. According to some other aspects the starting opportunities are shared for some coverage classes. Particularly, according to an embodiment each coverage class in the set of coverage classes is associated with a respective received power level, and those coverage classes whose received power levels differ less than a threshold value have at least partly overlapping starting opportunities.

According to an embodiment all coverage classes in the set of coverage classes share a common starting subframe for initiating the network access. The starting opportunity, during which the network access is initiated, is determined based on the common starting subframe. For avoiding collision, a common prachStartingSubframe can thus be configured. Then, collisions can be avoided since different offsets can be used for different coverage classes. As an example, different time offsets relative to the common starting subframe can be used. In other words, the offset can be dependent on the coverage class, and each coverage class can have its own offset. That is, according to an embodiment, all coverage classes in the set of coverage classes share a common starting subframe for initiating said network access, and each coverage class in the set of coverage classes has a unique offset for initiating the network access in relation to the common starting subframe, and the network access is initiated according to the unique offset. The offset may be defined in relation to the common starting subframe. The offset may for instance include a number of subframes indicating the distance in time from the common starting subframe to the starting opportunity. The offset may alternatively include a distance in time from the common starting subframe to the starting opportunity. Thus, if the offset for a coverage class is zero, one starting opportunity will be the common starting subframe, so that wireless devices associated with the coverage class will try to initiate network access during the common starting subframe.

Embodiments relating to determination of explicit starting opportunities used by the wireless device 200 for avoiding PRACH collision will now be disclosed.

According to an embodiment each coverage class in the set of coverage classes is associated with a unique number of repetitions for performing the network access. Like for eMTC, as reviewed above, the number of repetitions may be signaled by a parameter indicating the number of repetitions per attempt and an optional parameter indicating the number of attempts. While network access may be initiated in a subframe containing the starting opportunity, the subsequent repetitions may be outside this subframe. The unique offset for a given coverage class in the set of coverage classes is proportional to the unique number of repetitions for the given coverage class. Continuing the running non-limiting example, if the network node specifies the starting subframe as prachStartingSubframe=16, in the first period with N=0, then:

Coverage class 1 has no repetitions (repetition parameter=1) and thus offset=0·16+1=1, Coverage class 2 has 2 repetitions (repetition parameter=2) and thus offset=0·16+2=2, and Coverage class 3 has 8 repetitions (repetition parameter=8) and thus offset=0·16+8=8.

Figure 8:
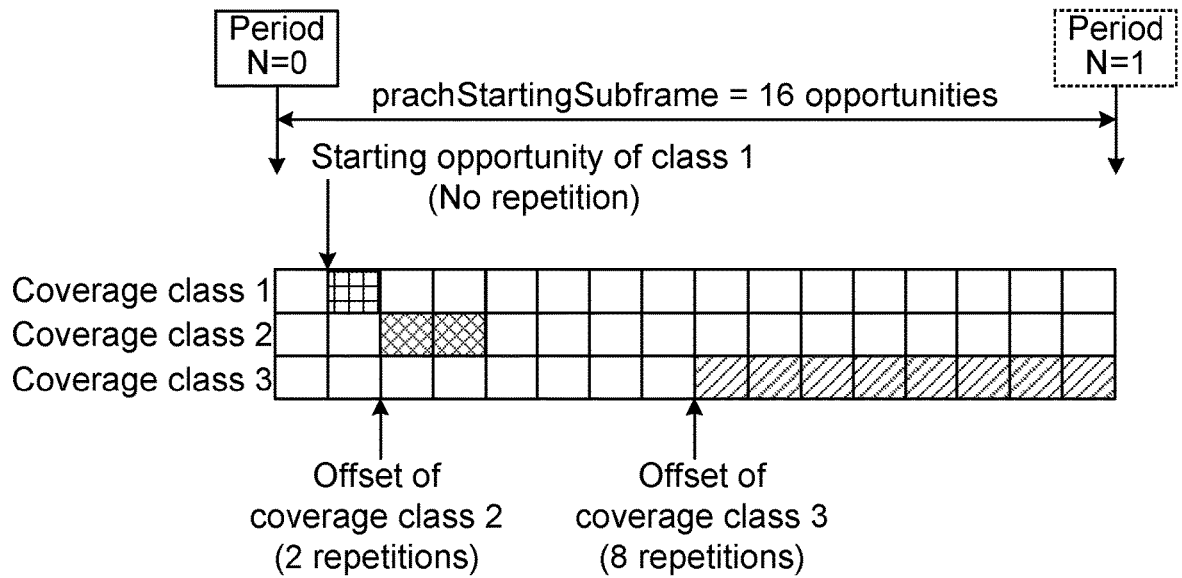
FIGS. 8-12 schematically illustrate PRACH opportunities according to embodiments.

The PRACH opportunities for the three coverage classes are illustrated in FIG. 8. FIG. 8 illustrates use of three different offsets. As also shown in FIG. 8, network access may be initiated in one subframe (starting opportunity) but may continue (e.g., by one or more repeated transmissions of the preamble sequence) into subsequent subframes. One drawback is that not all the PRACH opportunities can be used.

According to an embodiment, each of the coverage classes in the set of coverage classes is associated with a unique number of starting opportunities. Further, each coverage class in the set of coverage classes can be associated with a unique number of repetitions for initiating the network access. Network access may be initiated in said subframe but subsequent subframes may contain one or more transmissions repeating a same random access preamble sequence. The number of starting opportunities for a coverage class with relatively fewer repetitions is then higher than the number of starting opportunities for a coverage class with relatively many repetitions. To fully utilize the PRACH opportunities, the following scheduling of the starting opportunities could thus be used:

Coverage class 1 has starting subframes indexed $j \cdot P + k + N_{rep,1}$, for $k=0, 1, \ldots, (P/(4 \cdot N_{rep,1})-1)$. Here $N_{rep,1}$ is the number of repetitions of coverage class 1, and j is a sequence number of the period (time interval of length P). Transmitting the preamble sequence once may correspond to $N_{rep,1}=1$.

Coverage class 2 has starting subframes $(j+¼) \cdot P + k \cdot N_{rep,2}$, for $k=0, 1, \ldots, (P/(4 \cdot N_{rep,2})-1)$. Here $N_{rep,2}$ is the number of repetitions of coverage class 2.

Coverage class 3 has starting subframes $(j+½) \cdot P + k \cdot N_{rep,3}$, for $k=0, 1, \ldots, (P/(2 \cdot N_{rep,3})-1)$. Here $N_{rep,3}$ is the number of repetitions of coverage class 3.

In the above, it can be assumed that the PRACH of all three coverage classes share the same PRACH frequency band. Using the above scheduling of the starting opportunities, the number of PRACH opportunities in a period of length P is a function of the number of the repetitions of the given coverage class.

For the running non-limiting example, the following starting opportunities are obtained:

Coverage class 1 has no repetition and starting opportunities in subframes 0, 1, 2, 3, Coverage class 2 has 2 repetitions and starting opportunities in subframes 4, 6, and Coverage class 3 has 8 repetitions and starting opportunities in subframe 8.

Figure 9:
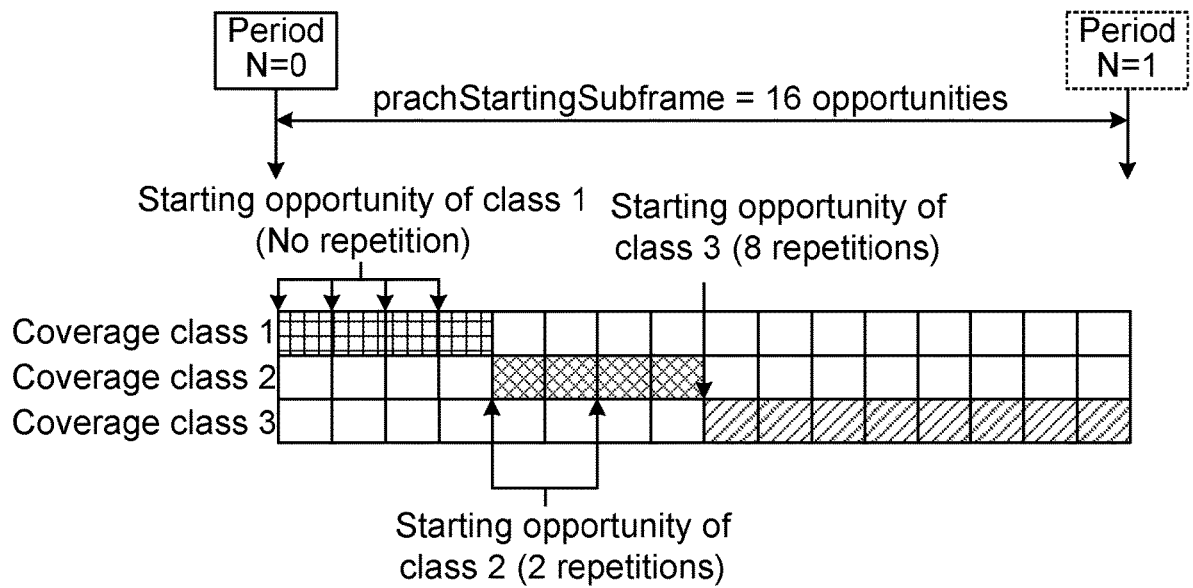

The PRACH opportunities for the three coverage classes are illustrated in FIG. 9. One drawback is that all the PRACH opportunities for a given coverage class are clustered.

It can be assumed that the network access is initiated in a frequency band. According to an embodiment the starting opportunity is dependent on how many of the coverage classes in the set of coverage classes share the frequency band of the coverage class of the wireless device. The wireless device 200 can then be provided with information from the network node 300 on how many of the coverage classes in the set of coverage classes share the frequency band of the coverage class of the wireless device 200, as in above steps S104, S204. For example, if only two coverage classes share the same PRACH frequency band, and P is the common prachStartingSubframe, then only those coverage classes sharing the same PRACH frequency band need to be considered. For example, if coverage class 1 and coverage class 3 share the same PRACH frequency band A, but coverage class 2 uses a separate PRACH frequency band B, then the following scheduling of the starting opportunities could be used:

Coverage class 1 has starting subframes $j \cdot P_{bandA} + k \cdot N_{rep,1}$, for $k=0, 1, \ldots, (P_{bandA}/(2 \cdot N_{rep,1})-1)$. Here $N_{rep,1}$ is the number of repetitions of coverage class 1, and j is again a sequence number of the period (time interval of length P).

Coverage class 2 has starting subframes $j \cdot P_{bandB}$. Parameter $P_{bandB}$ can be set with value $P_{bandB} \geq N_{rep,2}$, with $P_{bandB} = N_{rep,2}$ allowing the maximum number of PRACH opportunities for coverage class 2.

Coverage class 3 has starting subframes $(j+½) \cdot P_{bandA} + k \cdot N_{rep,3}$, for $k=0, 1, \ldots, (P_{bandA}/(2 \cdot N_{rep,3})-1)$. Here $N_{rep,3}$ is the number of repetitions of coverage class 3.

Figure 10:
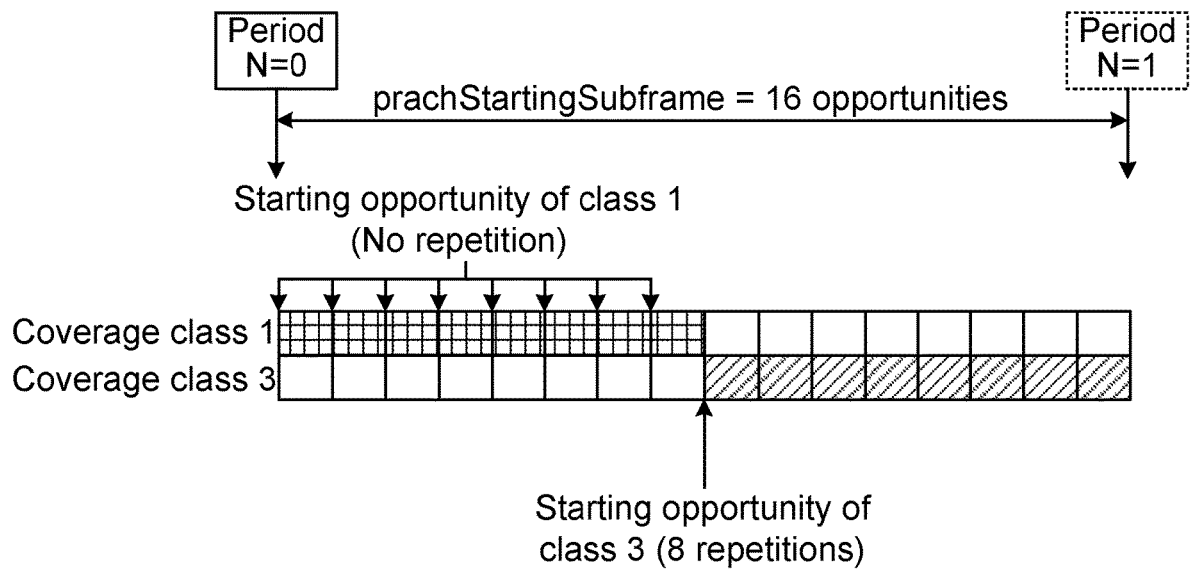

Since coverage class 2 uses a single PRACH frequency band, there is no collision. For coverage class 1 and coverage class 3, collision can be avoided as illustrated in FIG. 10.

Figure 11:
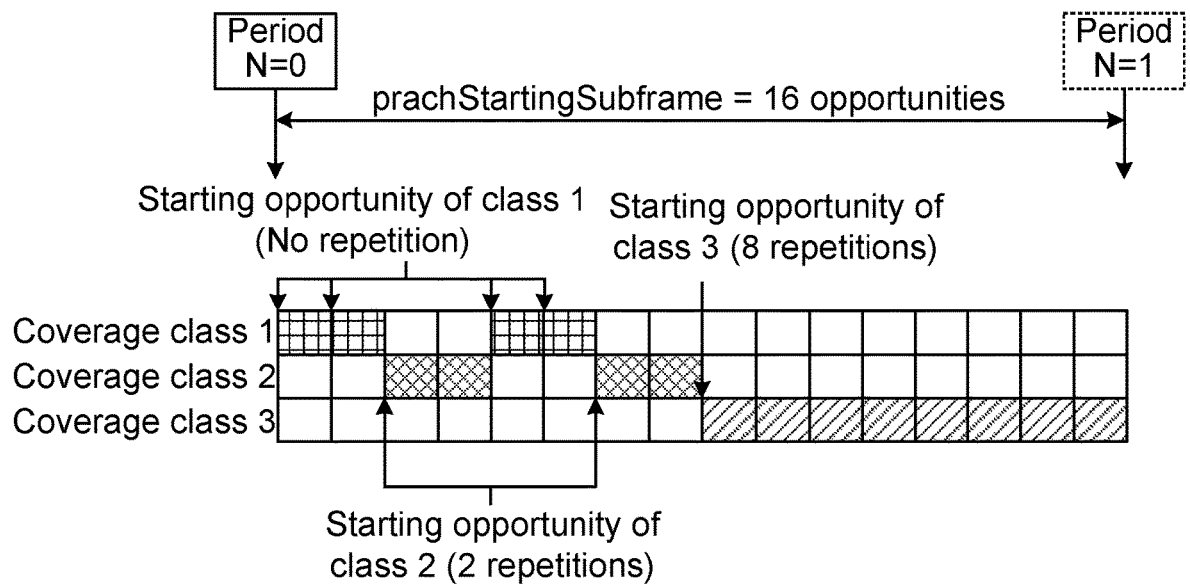

According to an embodiment, there are several possible starting opportunities. These several possible starting opportunities could then be distributed in time such that at least two of the several possible starting opportunities are separated by a starting opportunity of another coverage class in the set of coverage classes. Hence, the starting opportunities could be scheduled so as to distribute the PRACH opportunities over time. This is illustrated in FIG. 11. The wireless device 200 becomes aware of this configuration by receiving information from the network node 300 that one coverage class defines several possible starting opportunities between which at least one starting opportunity defined by a different coverage class is interposed.

Embodiments relating to determination of implicit starting opportunities used by the wireless device 200 for avoiding PRACH collision based on ranking of the wireless device 200 according to its coverage class and assigning a starting opportunity priority accordingly will now be disclosed. A ranking of wireless devices may arise from the fact that, on the one hand, each wireless device 200 is associated with a coverage class and, on the other hand, the coverage classes in the set of coverage classes are ranked in the sense that a given first coverage class is either higher, lower or identical to a given second coverage class.

According to an embodiment the starting opportunity is defined by the wireless device 200 backing off from initiating the network access. (For the avoidance of any doubt, it is pointed out that "backing off" in this sense is generally unrelated to the concept of "PA backoff" discussed initially.) The wireless device 200 may perform said backing-off on the basis of possible starting opportunities. If the wireless device 200 has backed off from initiating the network access in one possible starting opportunity, it will then determine whether to initiate the network access in a next possible starting opportunity. As a result, no two different coverage classes will share a common starting opportunity.

In more detail, according to aspects disclosed herein, the scheduling of the starting opportunities is based on a ranking approach. Specifically, the wireless devices are ranked according to their coverage class. Then, a higher coverage class is given higher priority over a lower coverage class. Hence, according to an embodiment, each coverage class in the set of coverage classes has its own set of starting opportunities for network access. In other words, when wireless devices in a lower coverage class determine their starting opportunities, they back off from those starting opportunities that may be used by wireless devices in higher coverage classes. Hence, according to an embodiment, all coverage classes in the set of coverage classes are ranked, and the wireless device backs off from a starting opportunity used by wireless devices in a higher ranked coverage class. The wireless device is thereby enabled to determine the next available subframe (containing the PRACH) permitted by the restrictions given by the subframes containing PRACH resources of a higher enhanced coverage class.

Figure 12:
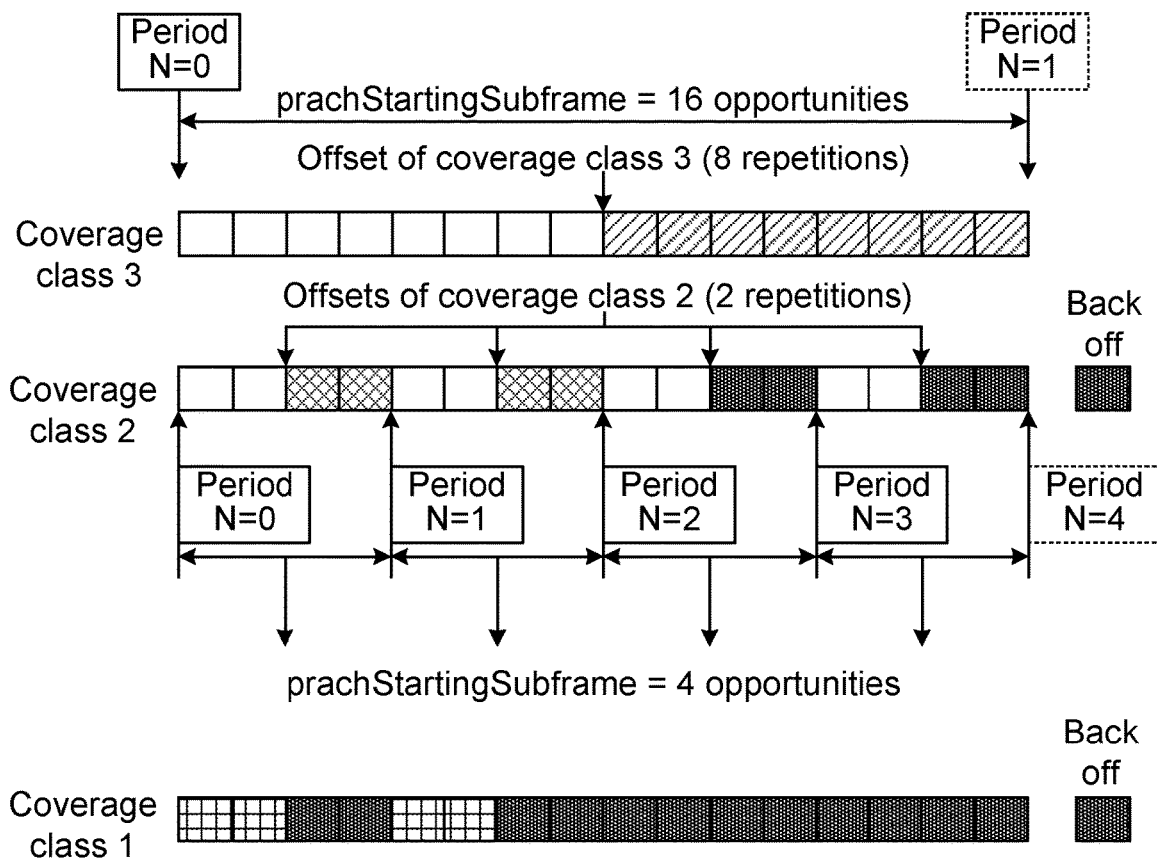

Continuing the non-limiting illustrative example, the following starting opportunities are scheduled as followed (as illustrated in FIG. 12):

Coverage class 3 has 8 repetitions: prachStartingSubframe=16 and thus offset=0·16+8=8 within 16 starting opportunities. Coverage class 3 has the highest priority and does not need to back off from any NPRACH resource.

Coverage class 2 has 2 repetitions: prachStartingSubframe=4 and thus offset={0, 1, 2, 3}·4+2={2, 6, 10, 14} within 16 starting opportunities. Coverage class 2 has lower priority than coverage class 3. Wireless devices in this coverage class then check the possible starting opportunities used by coverage class 3, and find that offset {2, 3} would lead to collision and thus back off from the collided PRACH resource.

Hence, with reference to FIG. 14, according to an embodiment, the wireless device is configured to perform steps S106 and S108, as follows.

S106: The wireless device checks possible starting opportunities of its own coverage class and of a higher ranked coverage class.

S108: The wireless device backs off from initiating network access in any of its possible starting opportunities that may be used by the higher coverage class.

Coverage class 1 has no repetitions (which may be represented by a value 1 of a repetition parameter) and potentially can use any PRACH opportunity with the following restriction. Coverage class 1 has the lowest priority. Wireless devices in this coverage class then check the possible starting opportunities used by coverage class 2 and coverage class 3, and back off from the PRACH resources that collide with coverage class 2 and coverage class 3 as a result of performing steps S106 and S108.

The ranking approach allows different prachStartingSubframe to be configured for different coverage classes. The ranking approach allows full utilization of all the PRACH opportunities. The ranking approach allows clustering of PRACH opportunities of any coverage class to be avoided. Furthermore, since the task of finding the available starting opportunities among the possible starting opportunities for a given coverage class is delegated to the wireless device 200, the ranking approach simplifies the central scheduling.

The ranking approach can be realized in different ways. According to an embodiment, the backing off is specified according to a physical layer specification or a medium access layer specification associated with the communications network. Below are two examples.

The starting opportunities can be scheduled according to a physical layer specification by using, e.g., explicit formulas and/or pseudocode that direct the wireless device 200 to determine the allowed starting opportunities.

The starting opportunities can be defined as part of the wireless device behavior by being realized at the medium access layer by specifying the behaviors in the presence of collision.

Figure 17:
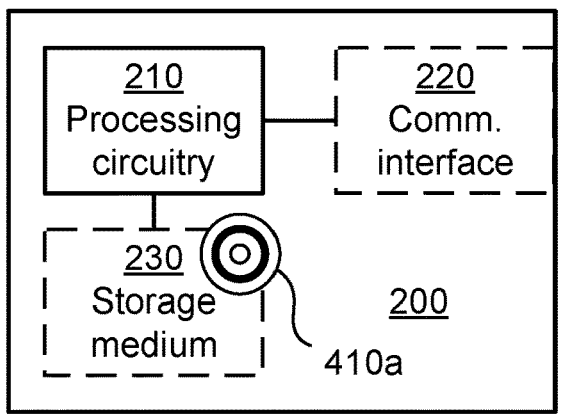
FIG. 17 is a schematic diagram showing functional units of a wireless device according to an embodiment.

FIG. 17 schematically illustrates, in terms of a number of functional units, the components of a wireless device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 410a (as in FIG. 21), e.g., in the form of a storage medium 230. The processing circuitry 210 may further be provided as at least one application specific integrated circuit (ASIC), or field programmable gate array (FPGA).

Particularly, the processing circuitry 210 is configured to cause the wireless device 200 to perform a set of operations, or steps, S102-S110, as disclosed above. For example, the storage medium 230 may store the set of operations, and the processing circuitry 210 may be configured to retrieve the set of operations from the storage medium 230 to cause the wireless device 200 to perform the set of operations. The set of operations may be provided as a set of executable instructions. Thus the processing circuitry 210 is thereby arranged to execute methods as disclosed herein.

The storage medium 230 may also comprise persistent storage, which, for example, can be any single one or combination of magnetic memory, optical memory, solid state memory or even remotely mounted memory.

The wireless device 200 may further comprise a communications interface 220 for communications at least with the network node 300. As such the communications interface 220 may comprise one or more transmitters and receivers, comprising analogue and digital components and a suitable number of antennas for wireless communications and ports for wireline communications.

The processing circuitry 210 controls the general operation of the wireless device 200 e.g. by transmitting data and control signals to the communications interface 220 and the storage medium 230, by receiving data and reports from the communications interface 220, and by retrieving data and instructions from the storage medium 230. Other components, as well as the related functionality, of the wireless device 200 are omitted in order not to obscure the concepts presented herein.

Figure 18:
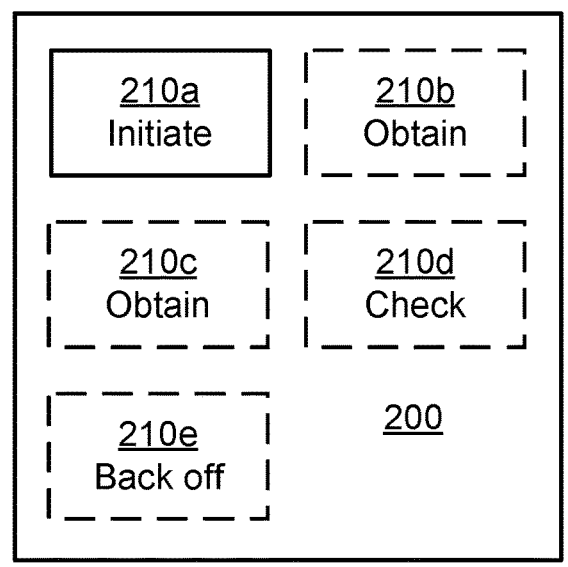
FIG. 18 is a schematic diagram showing functional modules of a wireless device according to an embodiment.

FIG. 18 schematically illustrates, in terms of a number of functional modules, the components of a wireless device 200 according to an embodiment. The wireless device 200 of FIG. 18 comprises an initiate module 210a configured to perform step S110. The wireless device 200 of FIG. 18 may further comprise a number of optional functional modules, such as any of an obtain module 210b configured to perform step S102, an obtain module 210c configured to perform step S104, a check module 210d configured to perform step S106, and a back-off module 210e configured to perform step S108. In general terms, each functional module 210a-210e may be implemented in hardware or in software. Preferably, one or more or all functional modules 210a-210e may be implemented by the processing circuitry 210, possibly in cooperation with the communications interface 220 and/or the storage medium 230. The processing circuitry 210 may thus be arranged to fetch, from the storage medium 230, instructions as provided by a functional module 210a-210e, and to execute these instructions, thereby performing any steps of the wireless device 200 as disclosed herein.

Figure 19:
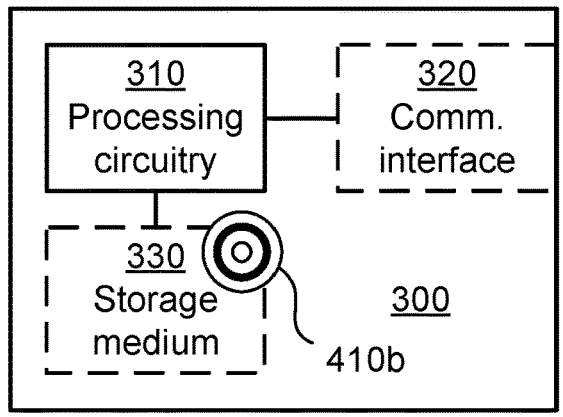
FIG. 19 is a schematic diagram showing functional units of a network node according to an embodiment.

FIG. 19 schematically illustrates, in terms of a number of functional units, the components of a network node 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 410b (as in FIG. 21), e.g. in the form of a storage medium 330. The processing circuitry 310 may further be provided as at least one application specific integrated circuit (ASIC), or field programmable gate array (FPGA).

Particularly, the processing circuitry 310 is configured to cause the network node 300 to perform a set of operations, or steps, S202-S204, as disclosed above. For example, the storage medium 330 may store the set of operations, and the processing circuitry 310 may be configured to retrieve the set of operations from the storage medium 330 to cause the network node 300 to perform the set of operations. The set of operations may be provided as a set of executable instructions. Thus the processing circuitry 310 is thereby arranged to execute methods as disclosed herein.

The storage medium 330 may also comprise persistent storage, which, for example, can be one of magnetic memory, optical memory, solid state memory or even remotely mounted memory, or a combination of two or more of these memory types.

The network node 300 may further comprise a communications interface 320 for communications at least with a wireless device 200. As such the communications interface 320 may comprise one or more transmitters and receivers, comprising analogue and digital components and a suitable number of antennas for wireless communications and ports for wireline communications.

The processing circuitry 310 controls the general operation of the network node 300 e.g. by transmitting data and control signals to the communications interface 320 and the storage medium 330, by receiving data and reports from the communications interface 320, and by retrieving data and instructions from the storage medium 330. Other components, as well as the related functionality, of the network node 300 are omitted in order not to obscure the concepts presented herein.

Figure 20:
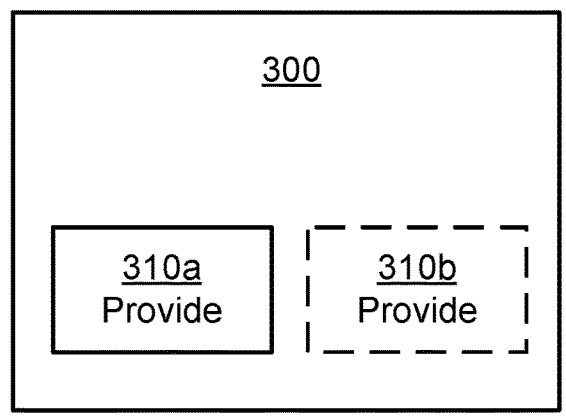
FIG. 20 is a schematic diagram showing functional modules of a network node according to an embodiment.

FIG. 20 schematically illustrates, in terms of a number of functional modules, the components of a network node 300 according to an embodiment. The network node 300 of FIG. 20 comprises a provide module 310a configured to perform step S202. The network node 300 of FIG. 20 may further comprise a number of optional functional modules, such as a further provide module 310b configured to perform step S204. In general terms, each functional module 310a-310b may be implemented in hardware or in software. Preferably, one or more or all functional modules 310a-310b may be implemented by the processing circuitry 310, possibly in cooperation with functional units 320 and/or 330. The processing circuitry 310 may thus be arranged to fetch, from the storage medium 330, instructions as provided by a functional module 310a-310b and to execute these instructions, thereby performing any steps of the network node 300 as disclosed herein.

The network node 300 may be provided as a standalone device or as a part of at least one further device. For example, the network node 300 may be provided in a node of the radio access network 110 or in a node of the core network 120, or even in a node of the service network 130. Alternatively, functionality of the network node 300 may be distributed between at least two devices, or nodes. These at least two nodes, or devices, may either be part of the same network part (such as the radio access network 110 or the core network 120) or may be spread between at least two such network parts. In general terms, instructions that are required to be performed in real time may be performed in a device, or node, operatively closer to the cell than instructions that are not required to be performed in real time.

Thus, a first portion of the instructions performed by the network node 300 may be executed in a first device, and a second portion of the of the instructions performed by the network node 300 may be executed in a second device; the embodiments disclosed herein are not limited to any particular number of devices on which the instructions performed by the network node 300 may be executed. Hence, the methods according to the embodiments disclosed herein are suitable to be performed by a network node 300 residing in a cloud computational environment. Therefore, although a single processing circuitry 310 is illustrated in FIG. 18 the processing circuitry 310 may be distributed among a plurality of devices, or nodes. The same applies to the functional modules 310a-310b of FIG. 20 and the computer program 420b of FIG. 21 (see below).

Figure 21:
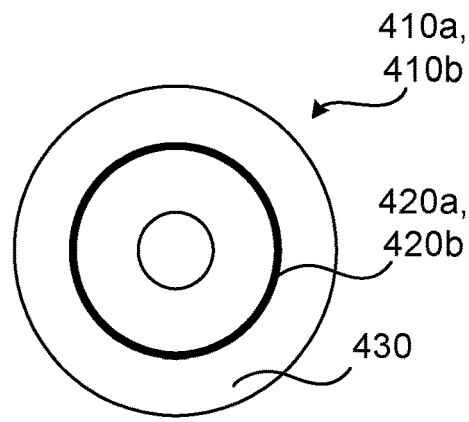
FIG. 21 shows one example of a computer program product comprising computer readable means according to an embodiment.

FIG. 21 shows one example of a computer program product 410a, 410b comprising computer readable means 430. On this computer readable means 430, a computer program 420a can be stored, which computer program 420a can cause the processing circuitry 210 and thereto operatively coupled entities and devices, such as the communications interface 220 and the storage medium 230, to execute methods according to embodiments described herein. The computer program 420a and/or computer program product 410a may thus provide means for performing any steps of the wireless device 200 as disclosed herein. On this computer readable means 430, a computer program 420b can be stored, which computer program 420b can cause the processing circuitry 310 and thereto operatively coupled entities and devices, such as the communications interface 320 and the storage medium 330, to execute methods according to embodiments described herein. The computer program 420b and/or computer program product 410b may thus provide means for performing any steps of the network node 300 as disclosed herein.

In the example of FIG. 21, the computer program product 410a, 410b is illustrated as an optical disc, such as a CD (compact disc) or a DVD (digital versatile disc) or a Blu-ray Disc™. The computer program product 410a, 410b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a flash memory, such as a compact flash memory. Thus, while the computer program 420a, 420b is here schematically shown as a track on the depicted optical disk, the computer program 420a, 420b can be stored in any way which is suitable for the computer program product 410a, 410b.

The inventive concept has mainly been described above with reference to a few embodiments. However, as is readily appreciated by a person skilled in the art, other embodiments than the ones disclosed above are equally possible within the scope of the inventive concept, as defined by the appended list of claims. For example, although at least some embodiments have been described in the context of NB-IoT, the embodiments disclosed herein apply equally to eMTC.

The invention claimed is:

1. A method, performed by a user equipment (UE), to access a communications network, wherein the UE is associated with a coverage class from a set of two or more coverage classes, each coverage class being associated with transmission of a different number of repetitions of a random access preamble sequence for performing network access, the set of two or more coverage classes sharing a frequency band, the method comprising the UE:

generating a Single-Carrier Frequency-Division Multiple Access (SC-FDMA) random access preamble signal comprising two or more consecutive preamble symbol groups, each preamble symbol group comprising a cyclic prefix portion and a plurality of symbols occupying a single subcarrier of the SC-FDMA random access preamble signal, wherein the single subcarrier for at least one of the preamble symbol groups corresponds to a first subcarrier frequency and the single subcarrier for an immediately subsequent one of the preamble symbol groups corresponds to a second subcarrier frequency; and initiating network access by transmitting the random access preamble signal at a starting opportunity related to the coverage class of the user equipment, such that each coverage class of the set of two or more coverage classes has a different starting opportunity, and such that collision in the shared frequency band is avoided between one coverage class and a different coverage class in the set of two or more coverage classes.

2. The method of claim 1, wherein the starting opportunity for transmitting the random access preamble signal is based at least on restrictions given by subframes occupied by PRACH resources related to a higher coverage class than the coverage class of the transmitting UE, the higher coverage class corresponding to a greater number of repetitions of a random access preamble sequence.

3. The method of claim 1, further comprising the UE:
receiving one or more parameters indicating at least one of the following:
a periodicity;
a subframe containing a starting opportunity; and
a number of repetitions per preamble transmission attempt;
determining, based at least in part on the received one or more parameters, one or more starting opportunities.

4. The method of claim 1, further comprising the UE:
receiving parameters indicating:
a periodicity;
a subframe containing a starting opportunity; and
a number of repetitions per preamble transmission attempt;
determining, based at least in part on the received parameters, one or more starting opportunities.

5. The method of claim 3, further comprising the UE receiving a parameter, the parameter indicating one of the following:
a periodicity,
a subframe containing a starting opportunity, and
a number of repetitions per preamble transmission attempt,
for at least one higher coverage class than the coverage class associated with the UE, the higher coverage class corresponding to a greater number of repetitions of a random access preamble sequence.

6. The method of claim 5, wherein one or more starting opportunities are determined by identifying possible starting opportunities related to the coverage class associated with the UE and avoiding those possible starting opportunities which may be used by UEs of the at least one higher coverage class.

7. The method of claim 6, wherein one or more starting opportunities are further determined by backing off from identified possible starting opportunities which may be used by a UE of the at least one higher coverage class.

8. The method of claim 3, wherein the received one or more parameters indicate a subframe containing a starting opportunity, by indicating a starting subframe common to all coverage classes in the set of coverage classes, from which the subframe containing the starting opportunity may be determined.

9. The method of claim 8:
wherein each coverage class in the set of coverage classes has a different offset for initiating the network access in relation to the common starting subframe; and
wherein the network access is initiated according to the offset.

10. The method of claim 3:
wherein the received one or more parameters indicates a number of repetitions per preamble transmission attempt; and
wherein the received one or more parameters have a unique value for each coverage class in the set of coverage classes.

11. The method of claim 1, wherein each coverage class in the set of coverage classes is associated with UEs having a respective received power level.

12. The method of claim 1, wherein the two or more coverage classes in the set of coverage classes are ranked and the UE backs off from initiating network access at a possible starting opportunity used by UEs associated with a higher coverage class.

13. A base station for enabling a user equipment (UE) to access a communications network, wherein the UE is associated with a coverage class from a set of two or more coverage classes, each coverage class being associated with transmission of a different number of repetitions of a random access preamble sequence for performing network access, the set of two or more coverage classes sharing a frequency band, the base station comprising:
a communication interface comprising one or more transmitters and one or more receivers; and
processing circuitry configured to cause the base station to:
transmit network access information to the UE, wherein the network access information specifies a starting opportunity at which the user equipment may initiate network access by transmitting a random access preamble, such that each coverage class of the set of two or more coverage classes has a different starting opportunity, and such that collision in the shared frequency band is avoided between one coverage class and a different coverage class in the set of two or more coverage classes; and
receive, at a starting opportunity related to the coverage class associated with the UE, a Single-Carrier Frequency-Division Multiple Access (SC-FDMA) random access preamble signal comprising two or more consecutive preamble symbol groups, each preamble symbol group comprising a cyclic prefix portion and a plurality of symbols occupying a single subcarrier of the SC-FDMA random access preamble signal, wherein the single subcarrier for at least one of the preamble symbol groups corresponds to a first subcarrier frequency and the single subcarrier for an immediately subsequent one of the preamble symbol groups corresponds to a second subcarrier frequency.

14. A user equipment (UE) configured to access a communications network, wherein the UE is further configured to be associated with a coverage class from a set of two or more coverage classes, each coverage class being associated with transmission of a different number of repetitions of a random access preamble sequence for performing network access, the set of two or more coverage classes sharing a frequency band, the user equipment comprising:
a communication interface comprising one or more transmitters;
processing circuitry configured to cause the UE to:

generate a Single-Carrier Frequency-Division Multiple Access (SC-FDMA) random access preamble signal comprising two or more consecutive preamble symbol groups, each preamble symbol group comprising a cyclic prefix portion and a plurality of symbols occupying a single subcarrier of the SC-FDMA random access preamble signal, wherein the single subcarrier for at least one of the preamble symbol groups corresponds to a first subcarrier frequency and the single subcarrier for an immediately subsequent one of the preamble symbol groups corresponds to a second subcarrier frequency; and initiate network access by transmitting the random access preamble signal at a starting opportunity related to the coverage class of the user equipment, such that each coverage class of the set of two or more coverage classes has a different starting opportunity, and such that collision in the shared frequency band is avoided between one coverage class and a different coverage class in the set of two or more coverage classes.

15. The UE of claim 14, wherein the processing circuitry is configured to cause the UE to determine the starting opportunity for transmitting the random access preamble signal at least based on restrictions given by subframes occupied by PRACH resources related to a higher coverage class than the coverage class of the transmitting UE, the higher coverage class corresponding to a greater number of repetitions of a random access preamble sequence.

16. The UE of claim 14:
wherein the communication interface further comprises one or more receivers; and
wherein the processing circuitry is further configured to cause the UE to:
  receive, using the communication interface, one or more parameters indicating at least one of the following:
    a periodicity;
    a subframe containing a starting opportunity; and
    a number of repetitions per preamble transmission attempt; and
  determine, based at least in part on the received one or more parameters, one or more starting opportunities.

17. The UE of claim 14:
wherein the communication interface further comprises one or more receivers; and
wherein the processing circuitry is further configured to cause the UE to:
  receive, using the communication interface, parameters indicating:
    a periodicity;
    a subframe containing a starting opportunity; and
    a number of repetitions per preamble transmission attempt; and
  determine, based at least in part on the received parameters, one or more starting opportunities.

18. The UE of claim 16, wherein the processing circuitry is further configured to cause the UE to receive a parameter using the communication interface, a parameter indicating one of
  a periodicity,
  a subframe containing a starting opportunity; and
  a number of repetitions per preamble transmission attempt,
for at least one higher coverage class than the coverage class associated with the UE, the higher coverage class corresponding to a greater number of repetitions of a random access preamble sequence.

19. The UE of claim 18, wherein the processing circuitry is configured to cause the UE to determine one or more starting opportunities by identifying possible starting opportunities related to the coverage class associated with the UE and avoiding those possible starting opportunities which may be used by UEs of the at least one higher coverage class.

20. The UE of claim 19, wherein the processing circuitry is configured to cause the UE to determine one or more starting opportunities further by backing off from identified possible starting opportunities which may be used by UEs of the at least one higher coverage class.

21. The UE of claim 16, wherein the received one or more parameters indicate a subframe containing a starting opportunity, by indicating a starting subframe common to all coverage classes in the set of coverage classes, from which the subframe containing the starting opportunity may be determined.

22. The UE of claim 21:
wherein each coverage class in the set of coverage classes has a different offset for initiating the network access in relation to the common starting subframe; and
wherein the network access is initiated according to the offset.

23. The UE of claim 16:
wherein the received one or more parameters indicates a number of repetitions per preamble transmission attempt; and
wherein the received one or more parameters have a unique value for each coverage class in the set of coverage classes.

24. The UE of claim 14, wherein each coverage class in the set of coverage classes is associated with UEs having a respective received power level.

25. The UE of claim 14, wherein the processing circuitry is further configured to cause the UE to generate a preamble signal in which the plurality of symbols of each preamble symbol group are identical.

26. The UE of claim 14, wherein the processing circuitry is further configured to cause the UE to generate a preamble signal for which the first and second subcarrier frequencies are related by a 1-subcarrier frequency shift or a 6-subcarrier frequency shift.

27. The UE of claim 14:
wherein UE is configured to be associated with a coverage class associated with two or more repetitions; and
wherein the processing circuitry is further configured to cause the UE to generate a preamble signal for which the first and second subcarrier frequencies are related by a pseudo-random frequency shift.

28. The UE of claim 14, wherein the shared frequency band is a 12-subcarrier frequency band.

29. The UE of claim 14:
wherein the two or more coverage classes in the set of coverage classes are ranked; and
wherein the processing circuitry is configured to cause the UE to back off from initiating network access at a possible starting opportunity used by UEs associated with a higher coverage class.

30. The UE of claim 29, wherein the backing-off is implemented on medium access layer level.

* * * * *

UNITED STATES PATENT AND TRADEMARK OFFICE
CERTIFICATE OF CORRECTION

PATENT NO. : 10,728,930 B2
APPLICATION NO. : 16/084334
DATED : July 28, 2020
INVENTOR(S) : Lin et al.

It is certified that error appears in the above-identified patent and that said Letters Patent is hereby corrected as shown below:

On the Title Page

In Item (72), under "Inventors", in Column 1, Line 2, delete "Hitech (IN);" and insert -- Hitech City (IN); --, therefor.

In the Specification

In Column 2, Line 15, delete "(PRACH) The" and insert -- (PRACH). The --, therefor.

In Column 3, Line 50, delete "sixth seventh" and insert -- sixth, seventh --, therefor.

In Column 4, Line 4, delete "drawings, on" and insert -- drawings, in --, therefor.

In Column 5, Line 58, delete "radio access network 100" and insert -- radio access network 110 --, therefor.

In Column 11, Lines 20-21, delete "$j \cdot P + k + N_{rep.1},$" and insert -- $j \cdot P + k \cdot N_{rep.1}$ --, therefor.

In the Claims

In Column 19, Line 60, in Claim 18, delete "one of" and insert -- one of: --, therefor.

In Column 19, Line 62, in Claim 18, delete "opportunity; and" and insert -- opportunity, and --, therefor.

Signed and Sealed this
Sixteenth Day of March, 2021

Drew Hirshfeld
*Performing the Functions and Duties of the
Under Secretary of Commerce for Intellectual Property and
Director of the United States Patent and Trademark Office*